Figure 1:
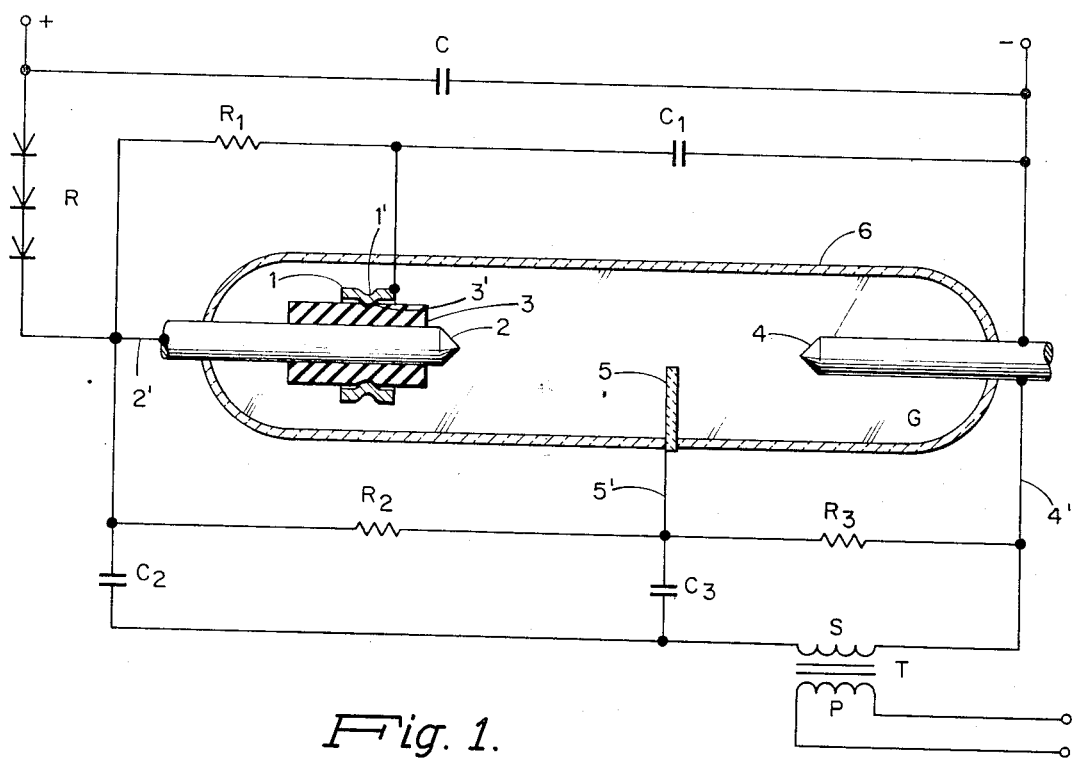

United States Patent [19]
Goldberg

[11] 3,775,641
[45] Nov. 27, 1973

[54] METHOD OF AND APPARATUS FOR FLASH DISCHARGE

[75] Inventor: Jacob Goldberg, Cambridge, Mass.

[73] Assignee: United States Scientific Instruments, Inc., Watertown, Mass.

[22] Filed: May 30, 1972

[21] Appl. No.: 254,776

[52] U.S. Cl. ............... 315/261, 313/188, 313/198, 315/203, 315/330, 315/335
[51] Int. Cl. .......................................... H05b 41/16
[58] Field of Search ................ 313/188, 192, 197, 313/198, 208, 353; 315/36, 194, 203, 261, 315/268, 330, 335, 334, 349

[56] References Cited
UNITED STATES PATENTS

| | | | |
|---|---|---|---|
| 1,609,024 | 11/1926 | Lely, Jr. et al. | 313/198 X |
| 2,071,057 | 2/1937 | Barvch | 313/192 X |
| 2,212,881 | 8/1940 | Lecorguillier | 313/188 X |

*Primary Examiner*—Roy Lake
*Assistant Examiner*—Lawrence J. Dahl
*Attorney*—Rines and Rines

[57] ABSTRACT

This disclosure is concerned with increasing the reliability of triggering a discharge between a pair of electrodes in a gas-discharge tube or the like, by generating, apart from the triggering, an intense electric field adjacent one of the electrodes (but outside the discharge region), while substantially inhibiting arcing during such generation.

8 Claims, 2 Drawing Figures

PATENTED NOV 27 1973                3,775,641

METHOD OF AND APPARATUS FOR FLASH DISCHARGE

The present invention relates to methods of and apparatus for flash discharge, being more particularly concerned with high-pressure gas-discharge tubes and the like useful for stroboscopy, flash-photography and related uses, as well as other flash-discharge applications.

The problems underlying the reliable, repetitive, steady source flashing of flashtubes and the like have been approached and compromised for many years by a myriad of techniques, including the use of pluralities of trigger electrodes guiding the arc to try to insure stable position and accurate timing with little jitter (U.S. Pats. No. 2,977,508; 3,286,128; and 3,355,625. Other approaches have included employing additional radiation breakdown sources such as, for example, ancillary internal two-electrode spark gaps as described, for example, in U.S. Pat. Nos. 3,350,602 and 3,356,888.

While such techniques have found application in many uses, there are more stringent applications wherein a vastly greater measure of reliability and freedom from jitter (far better than the present-day hundreds or more nanoseconds of jitter) are required than can be achieved by these approaches; and it is the solution of this problem that the present invention has as one of its primary objectives.

A further object of the invention is to provide a novel method of and apparatus for flash discharge that can eliminate the necessity for the costly and less accurate structures embodying pluralities of guiding trigger electrodes and/or separate spark gap sources and the like described, for example, in said patents.

An additional object is to provide a novel flash discharge apparatus and method of more general utility, as well.

Other and further objects are explained hereinafter and are more particularly set forth in the appended claims. From one of its aspects, however, this disclosure is concerned with increasing the reliability of triggering a discharge between a pair of electrodes in a gas-discharge tube or the like, by generating, apart from the triggering, an intense electric field adjacent one of the electrodes (but outside the discharge region), while substantially inhibiting arcing during such generation. It has been discovered that through this technique, a vast improvement in reliability and freedom from jitter is obtained. Preferred constructional and other details are later presented.

Figure 2:
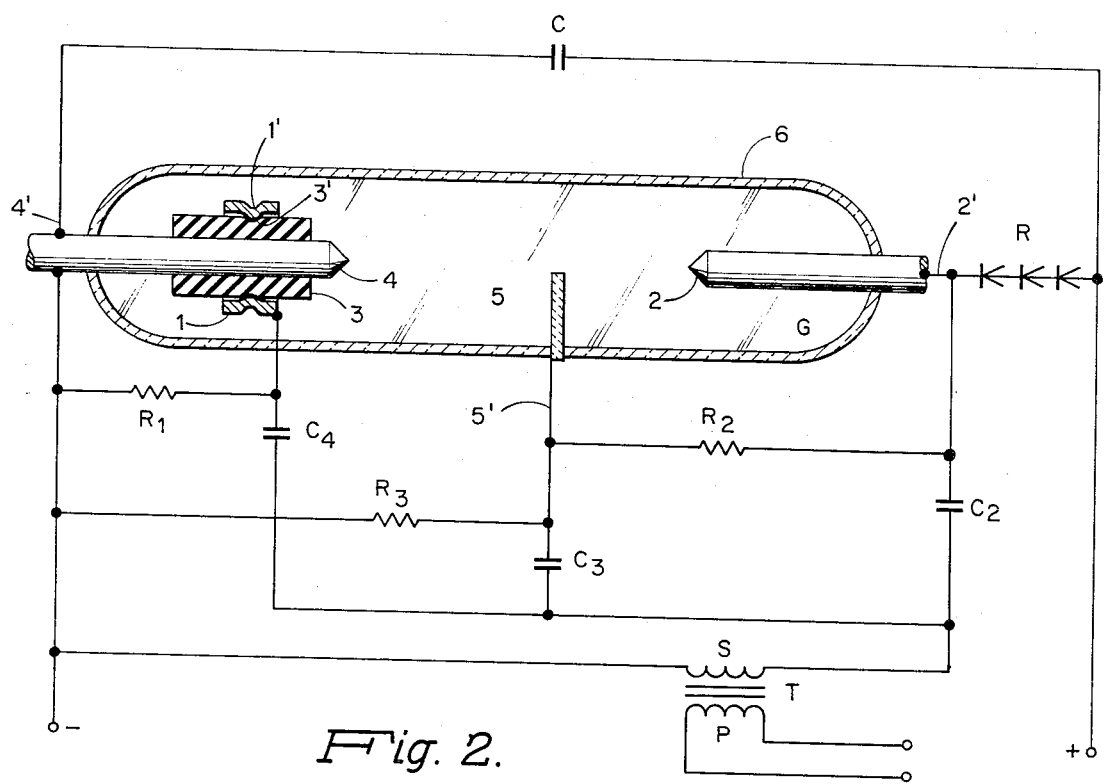

The invention will now be described with reference to the accompanying drawing, FIG. 1 of which is a combined circuit diagram and longitudinal section illustrating the invention in preferred form; and FIG. 2 is a similar view of a modification.

Referring to the drawing, a flashtube or similar flash device is shown comprising a sealed envelope 6 (transparent for flash illumination applications) containing a pressurized gas G, such as xenon or the like, as described in said patents, and a pair of elongated principal electrodes, shown as an anode 2 and an in-line cathode 4 defining between their free or inner ends (illustrated as pointed) a gas-discharge flash region. A trigger electrode 5 is disposed preferably just to enter said region at an appropriate intermediate point to assist in the breakdown of the gas in response to a trigger pulse applied to the primary winding P of a pulse transformer T. That pulse is developed by the secondary winding S across resistance $R_3$ and capacitor $C_3$, being conveyed by the latter at 5' to the trigger electrode 5. Assuming that this triggering is reliable, the main discharge voltage stored from the source +, -, in capacitor(s) C will then produce a flash discharge between the anode 2 and the cathode 4 as a result of the illustrated connections; to wit, the + terminal of C being connected through rectifiers R to the anode lead 2', and the — terminal to the cathode lead 4', as described also in said patents.

As before stated, particularly in repetitive flashing operations, the jitter produced from flash to flash as a result of inaccuracies in timing of breakdown and in wandering of the flash discharge itself, have not permitted satisfactory extremely accurate operation for stringent applications. In accordance with the present invention, however, it has been discovered that the use of an intense electrical field developed at one of the principal electrodes at the time of triggering, but separate therefrom and outside the discharge region, can produce an effect that results in much more accurately assuring the prompt breakdown in response to triggering and the more stringent confining of the flash, to produce far less jitter than otherwise obtainable. It has been found important, however, unlike the before-mentioned prior-art extra spark-gap irradiators and the like, that sparking or arcing to the principal electrode as a result of this momentary intense field be inhibited and substantially suppressed.

In FIG. 1, these ends are achieved by a supplemental electric-field intensification electrode 1, illustrated as a conductive sleeve or band loosely coaxially mounted about part of an insulating cylinder 3, in turn loosely coaxially mounted about part of the elongated anode 2. The electrode 1 is mechanically secured at a point 1' to a correspondingly crimped point 3' of the insulating sleeve 3 to keep it from wandering along the insulator during use of the tube, but is otherwise preferably floating outside the insulating sleeve 3. The latter, moreover, is extended closer to the right-hand or free discharge end of the anode 2 than the intensification electrode 1, and sufficiently closer to insure that the right-hand-most point of the electrode 1 is electrically obscured by the insulating sleeve 3 from the exposed tip of the anode 2, so as to inhibit arcing therebetween when a voltage impulse (substantially simultaneous with the trigger pulse for the trigger electrode 5) is applied between the anode 2 and the intensification electrode 1. That voltage impulse is shown derived from the secondary winding S and applied to the network $C_2$-$R_2$, with capacitor $C_2$ connected to the anode lead 2'. Resistor $R_1$ and capacitor $C_1$ are connected between the anode 2 and the cathode 4, with the intensification electrode 1 connected to the junction of $R_1$ and $C_1$, such that the before-mentioned intense electrical field is instantaneously momentarily developed between electrodes 1 and 2 across insulator 3 and along a substantial portion of the elongated anode 2, but without generating an active arc or spark therebetween. Under these circumstances, as before explained, it has been discovered that a greater reliability in triggering and stable flash discharge position occurs by the action of this instantaneous intense field external to the discharge gap region.

As an example, a lamp having two principal electrodes 10 mm. long and 1 mm. in diameter, spaced 2 mm. apart, was repetitively flashed with jitter of the order of only 10 nanoseconds in the time of firing, as compared to 100 or more nanoseconds with prior art structures as described in said patents. The gas within the tube was xenon, operated at a pressure of about 30 inches of mercury. The anode was of tungsten; and the cathode was a sintered mixture consisting of 95 percent tungsten with the balance of barium aluminate. The length of the insulator sleeve 3, (a ceramic tube), was approximately 6 mm., coaxially mounted about the anode with the anode tip protruding about 1 mm. therefrom. The electrode 1 was a sleeve of nickel, 5,000ths of an inch thick and about 2 ½ millimeters long, crimped to the insulator and otherwise maintained about 1 mm. from the outer face of the cylindrical insulator 3.

Tests have also shown the efficacy of this invention with the intensification structure applied to the cathode 4 rather than the anode construction, as more particularly shown in FIG. 2.

Further modifications will also occur to those skilled in this art and all such are considered to fall within the spirit and scope of the invention as defined in the appended claims.

What is claimed is:

1. Flash-discharge apparatus having, in combination, a gasfilled envelope, a pair of elongated spaced principal electrodes disposed within the envelope and defining a gas-discharge region in the space between opposing free ends thereof, trigger electrode means disposed near said region, electric-field intensification electrode means disposed along a portion of one of the principal electrodes from a point inward of the free end of said one principal electrode and with insulating means disposed between the intensification electrode means and said one principal electrode, the said insulating means extending beyond said point toward the free end of said one principal electrode sufficiently substantially to obscure the end of the intensification electrode means at said point from the free end of said one principal electrode in order to discourage the generation of an arc therebetween, means for applying voltage-to-be-discharged between said principal electrodes, and means for substantially simultaneously applying trigger voltage to said trigger electrode means and voltage between said intensification and one of the principal electrodes for developing an intense electric field that, while inhibiting arcing therebetween, causes the effects of said field to aid in said triggering and thus to produce the flash-discharge between said principal electrodes in said gas-discharge region.

2. Flash-discharge apparatus as claimed in claim 1 and in which said insulating means is disposed about said one principal electrode and the intensification electrode means is disposed about said insulating means, being only mechanically secured to a portion thereof to prevent wandering.

3. Flash-discharge apparatus as claimed in claim 2 and in which said insulating and intensification electrode means are coaxial with said one principal electrode.

4. Flash-discharge apparatus as claimed in claim 1 and in which said one principal electrode is an anode.

5. Flash-discharge apparatus as claimed in claim 1 and in which said one principal electrode is a cathode.

6. A method of producing flash-discharge in a region of a gas between a pair of electrodes, that comprises, applying a voltage-to-be-discharged between the electrodes, triggering the breakdown of the gas in said region to enable such discharge, and, during the triggering and apart therefrom, generating an intense electric field outside said region in the immediate vicinity of one of the electrodes while suppressing arcing to said one electrode under the influence of said field, to improve the reliability of the triggering breakdown.

7. A method as claimed in claim 6 and in which said one electrode is elongated and said intense electric field is developed parallel to said one electrode along a substantial portion thereof but remote and obscured from the discharge end thereof.

8. Flash-discharge apparatus having, in combination, a gas-filled envelope, a pair of elongated spaced principal electrodes disposed within the envelope and defining a gas-discharge region in the space between opposing free ends thereof, trigger electrode means disposed near said region, electric-field intensification electrode means disposed along a portion of one of the principal electrodes from a point spaced from the free end of said one principal electrode, insulating means disposed between the intensification electrode means and said one principal electrode for obscuring the end of the intensification electrode means at said point from the free end of said one principal electrode in order to discourage the generation of an arc therebetween, means for applying voltage-to-be-discharged between said principal electrodes, and means for substantially simultaneously applying trigger voltage to said trigger electrode means and voltage between said intensification and one of the principal electrodes for developing an intense electric field that, while inhibiting arcing therebetween, causes the effects of said field to aid in said triggering and thus to produce the flash-discharge between said principal electrodes in said gas-discharge region.

* * * * *